US 12,422,255 B2

(12) United States Patent
Taylor

(10) Patent No.: US 12,422,255 B2
(45) Date of Patent: Sep. 23, 2025

(54) TILT DETERMINATION

(71) Applicant: Cirque Corporation, Sandy, UT (US)

(72) Inventor: David Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 197 days.

(21) Appl. No.: 18/479,221

(22) Filed: Oct. 2, 2023

(65) Prior Publication Data

US 2025/0109939 A1 Apr. 3, 2025

(51) Int. Cl.
*G01C 9/02* (2006.01)

(52) U.S. Cl.
CPC ...................... *G01C 9/02* (2013.01)

(58) Field of Classification Search
CPC ...................................... G01C 9/02
See application file for complete search history.

(56) References Cited

U.S. PATENT DOCUMENTS

| 8,214,988 | B2 | 7/2012 | LeFebure |
| 9,965,060 | B1 | 5/2018 | Yeh et al. |
| 11,385,645 | B2 | 7/2022 | Wang |
| 2005/0052425 | A1 | 3/2005 | Zedesky |
| 2007/0261258 | A1 | 11/2007 | Ahn |
| 2008/0202824 | A1 | 8/2008 | Philipp |
| 2011/0018816 | A1 | 1/2011 | Liu |
| 2012/0249468 | A1 | 10/2012 | Cole |
| 2013/0050099 | A1 | 2/2013 | Hirano |
| 2015/0009155 | A1* | 1/2015 | Tsao ...................... G06F 3/0442 345/173 |
| 2016/0313829 | A1* | 10/2016 | Teranishi .............. G06F 3/0445 |
| 2021/0247896 | A1 | 8/2021 | Tanemura et al. |
| 2021/0303152 | A1* | 9/2021 | Hosur ..................... G06F 3/044 |

* cited by examiner

Primary Examiner — Stephanie E Bloss
Assistant Examiner — Michael A Harrison

(57) ABSTRACT

A capacitance module may include a substrate, a set of electrodes formed on the substrate where a first generally linear electrode of the set may be aligned with a second generally linear electrode of the set; a controller in communication with the set of electrodes; and memory having programmed instructions configured to cause the controller, when executed, to measure a change in capacitance; and determine a tilt of an object in proximity to the substrate based, in part, on the measured change in capacitance.

17 Claims, 17 Drawing Sheets

TILT DETERMINATION

FIELD OF THE DISCLOSURE

This disclosure relates generally to systems and methods for determining the tilt of an object. In particular, this disclosure relates to systems and methods for the tilt of an object with a capacitance sensor.

BACKGROUND

A touch pad is often incorporated into laptops and other devices to provide a mechanism for giving inputs to the device. For example, a touch pad may be positioned adjacent to a keyboard in a laptop and include a surface that can be touched by the user. Touch pads may operate using capacitive sensing, a technology that senses the change of capacitance where a finger touches the pad. In some examples, moving a finger, stylus, or another type of object on the touch pad may cause a cursor to move on a display in communication with the touch pad.

An example of a touch pad is disclosed in U.S. Patent Publication No. 2007/0261258 issued to Hyeong-Joon Ahn, et al. This reference discloses a plate type capacitive sensor for five-dimensional displacement measurement that is capable of simultaneously measuring five-dimensional movement of an object, which includes the horizontal movement, the vertical movement, and the tilt of the object. The plate type capacitive sensor for five-dimensional displacement measurement comprises a plate located adjacent to an object to be measured, and a ground part, a first guard part, a displacement measuring sensor, and a second guard part, which are stacked on the plate in consecutive order. The plate may be made by machining or made of a printed circuit board (PCB).

Another example of a touch pad is disclosed in U.S. Patent Publication No. 2008/0202824 issued to Harald Philipp, et al. This reference discloses a control panel for controlling a device in response to user indications, the control panel comprising a position sensing element having a sensing surface, and a position interface circuit. The position interface circuit is operable to determine a position of an object on the sensing surface when the object is applied to the sensing surface of the position sensing element. At least one pressure sensing device and the sensing surface of the position sensing element are arranged with the effect that a displacement of the sensing surface with respect to the pressure sensing device in response to the pressure applied by the object is detectable by the pressure sensing device. As such, in one example, the position interface circuit is operable to identify one or more of a plurality of user indicated signals by correlating the position of the object on the sensing surface with a pressure detected by the pressure sensing device. The sensing surface may include pre-designated and pre-determined locations representing virtual buttons so that by determining whether the object is at one of a plurality of pre-determined locations on the sensing surface of the position sensing element, the position interface circuit can identify the user indicated signal by correlating the position of the object at one of the predetermined locations with the detected pressure, each of the pre-determined location corresponding to one of the plurality of user indicated signals.

Another example of a touch pad is disclosed in U.S. Patent Publication No. 2011/0018816 issued to Bo-Wen LIU, et al. This reference discloses a modular touch control assembly is applicable to an electronic device for generating contact operating signals and a press operating signals. The modular touch control assembly includes a substrate, a touchpad, and at least one elastic member. The touchpad is disposed on the substrate and is provided to be contacted to generate the contact operating signals. The touchpad is also provided to be pressed and tilted, and detectors such as switches or displacement detectors monitor the touchpad. As the touchpad is tilted, a corresponding press operating signal is generated by the detectors according to the direction that the touchpad is tilted. The elastic member is disposed between the touchpad and the substrate, to be pressed by the tilted touchpad, to generating an elastic force to reset the touchpad to the original position.

Each of these references are herein incorporated by reference for all that they disclose.

SUMMARY

In one embodiment, a capacitance module may include a substrate, a set of electrodes formed on the substrate where a first generally linear electrode of the set may be aligned with a second generally linear electrode of the set; a controller in communication with the set of electrodes; and memory having programmed instructions configured to cause the controller, when executed, to measure a change in capacitance; and determine a tilt of an object in proximity to the substrate based, in part, on the measured change in capacitance.

The measuring a change in capacitance may include transmitting a signal with the first generally linear electrode; and measuring a response with the second generally linear electrode.

The measuring a change in capacitance includes transmitting a signal with the second generally linear electrode when the first generally linear electrode may be transmitting the signal; and measuring a response with the second generally linear electrode when the first generally linear electrode may be measuring the response.

The capacitance module may include a second set of electrodes transversely oriented with respect to the first set of electrodes.

The measuring a change in capacitance may include transmitting a positive signal with the first generally linear electrode and transmitting a negative signal with the second generally linear electrode.

The measuring a change in capacitance may include combining a first response measurement from the first signal and combing a second response measurement from the second signal to make a combined response measurement.

The determining a tilt of the object includes determining that the tilt may be in a first direction when the combined measurement has a positive value and determining that the tilt may be in a second direction with the combined measurement has a negative value.

The determining a tilt of the object may include determining that the tilt may be in a first direction when a response measurement has a positive value and determining that the tilt may be in a second direction with the response measurement has a negative value, where the response measurement may be made with a sense electrode in communication with both the first generally linear electrode and the second generally linear electrode.

The measuring a change in capacitance may include transmitting a signal with the first generally linear electrode and the second generally linear electrode; and measuring a response with a third generally linear electrode that may be transversely oriented with respect to the first generally linear electrode and to the second generally linear electrode.

A computer-program product may include a non-transitory computer-readable medium storing instructions executable by a controller to receive a first measurement from a first generally linear electrode; receive a second measurement from a second generally linear electrode, where the first generally linear electrode may be aligned with the second generally linear electrode; analyze the first measurement and the second measurement; and determine a tilt of an object based on analysis.

The analyzing the first measurement and the second measurement may include combining the first measurement and the second measurement to form a combined measurement.

The determining the tilt includes determining that the tilt may be in a first direction when the combined measurement has a positive value and determining that the tilt may be in a second direction with the combined measurement has a negative value.

The analyzing the first measurement and the second measurement includes determining a tilt of an object includes determining that the object may be tilted in a first direction when the first measurement may be greater than the second measurement and determining that the object may be tilted in a second direction when the second measurement may be greater than the first measurement.

The instructions may be further executable to send an instruction to transmit a signal with the first generally linear electrode and the second generally linear electrode at the same time to determine an elevation of the object.

In some embodiments, a computer-program product may include a non-transitory computer-readable medium storing instructions executable by a controller to receive a capacitance measurement from a first electrode; determine that an object may be tilting in a first direction when the capacitance measurement is positive and determine that the object may be tilting in a second direction when the capacitance measurement is negative.

The instructions may be executable to instruct a second electrode to transmit a positive signal; and instruct a third electrode to transmit a negative signal.

The first electrode may be a first electrode may be a sense electrode in communication with the second electrode and the third electrode; and where the first electrode is transversely oriented with respect to the second electrode and the third electrode.

The instructions may be executable to send an instruction to transmit a signal with the first electrode, the second electrode, and the third electrode at the same time.

The instructions may be executable to take an elevation measurement with the first electrode, the second electrode, and the third electrode at the same time; and determine an elevation of the object based on the elevation measurement.

The capacitance measurement may be a mutual capacitance measurement.

Figure 1:
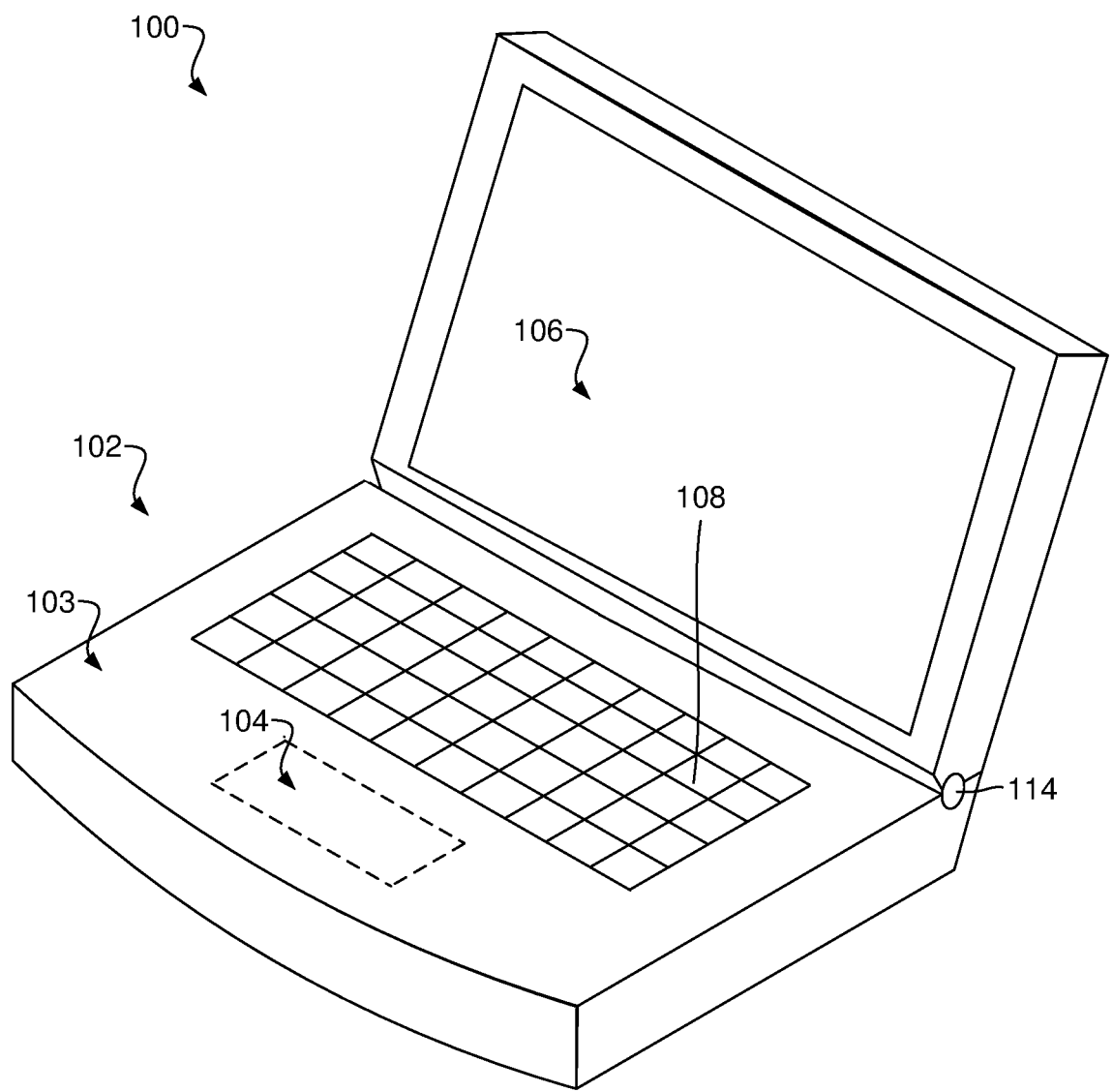
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "keyboard input" may generally refer to an input on a keyboard that sends a specific electrical signal to a controller in communication with the keyboard. In some examples, a keyboard input may send a signal to a controller to indicate that a certain key on the keyboard has been pressed. In some examples, a controller in communication with the keyboard may determine the key, the location of the key, the length of the press on the key, the pressure exerted on the key, another property of the input, or a combination thereof. In some examples, the keyboard input may correspond to an electrical short created by a key being pressed and making contact with an array of contacts on the keyboard. In other examples, a keyboard input may correspond to a capacitive reading on the grid of contacts based on an object moving proximate the keyboard. In some examples, the keyboard is a separate input device from the capacitance module. In some cases, a controller controlling an operation of the keyboard is independent of another controller that controls the operation of the capacitance module. In some cases, the location of the keyboard input may determine the mode for the touch inputs. In some examples, the location of the keyboard input may determine which portion of the capacitance module operates in a different mode. For example, keyboard inputs for buttons located forward of (e.g., towards the display of the laptop) and near the right side of the capacitance module may cause the capacitance module to switch a different mode on just the right portion of the capacitance module.

For the purposes of this disclosure, the term "capacitive input keyboard" may generally refer to a keyboard that receives inputs based on capacitive signals from an object moving proximate the keyboard. In some examples, a capacitive input keyboard may be integrated into a touch screen device. In some examples, a capacitive keyboard may change size, shape, or location based on inputs from a controller in communication with the keyboard. In some examples, a capacitive input keyboard may determine the location, magnitude, velocity, another property, or a combination thereof, of a capacitive input of an object moving proximate the capacitive input keyboard.

For the purposes of this disclosure, the term "cover" may generally refer to a material with a thickness that, in part, defines a cavity. Electronics, such as a capacitance sensor, a battery, memory, a central processing unit, an audio speaker, another types of circuitry, or combination thereof may be disposed within the cavity. In some examples, a display, a keyboard, a speaker grill, another type of user interface, or combination thereof, may be incorporated into the cover. In some cases, an electronic device includes a hinge that connects a display portion to a keyboard portion. In such an example, the cover may refer to an inside surface of the hinged device when the display portion is rotated to come into contact with the keyboard portion, and the keyboard is incorporated into the cover. In some cases, the cover includes a seamless palm rest portion that is adjacent to and spaced away from the keyboard. A seamless palm rest portion may be made of a solid, continuous material, such as glass, metal, plastic, another material, hybrids thereof, mixtures there, or combinations thereof. In some cases, the seamless palm rest portion also includes a touch sensitive area that is indistinguishable from other areas of the palm rest portion when there is no illuminated feature to identify where the touch sensitive area is located. The texture of the touch sensitive area and the other areas of the palm rest portion may be the same. The look of the touch sensitive area and the other areas of the palm rest portion may be the same. However, in some examples of a non-seamless palm rest portion, an opening may be defined in the palm rest portion of the cover for the insertion of an overlay to a capacitance module.

The touch sensitive area may be formed in conjunction with a capacitance module formed either adjacent to the cover or to an overlay inserted into the cover. In a seamless palm rest portion, the first surface of the cover may be accessible for touch by a user and a second side of the cover may be obscured from the user's view and inside a cavity defined, in part, by the cover. Near the second side of the cover and within the cavity, a capacitance module may be positioned to detect changes in capacitance within a predetermined area of the first surface of the cover, which may define the touch sensitive area. In some examples where an overlay is inserted into an opening of the cover, the capacitance module may be located within the cavity near the overlay and may form a touch sensitive area on the accessible surface of the overlay.

For the purposes of this disclosure, the term "generally linear electrode" may generally refer to an electrode that measures and/or transmits a signal along a linear swath of an area. In some examples, a generally linear electrode may be located adjacent a touch sensitive area of a surface and the generally linear electrode may be dedicated to sensing and/or transmitting within a generally linearly shaped sub-area within the touch sensitive area. In one example, the generally linear electrode may span from a first side to a second side of the touch sensitive area, where the second side is opposite of the first side. In some cases, the generally linear electrode may be routed in a non-linear manner but may still be configured to just sense and/or transmit within the generally linearly shaped sub-area. In some examples, a generally linear electrode is not part of a ring or a segmented portion of a ring. In some examples, the generally linear electrode may have a strictly linear shape, a generally wavy shape, a generally asymmetric shape, a generally symmetric shape, a generally zigzag shape, a generally curved shape, another shape, or combinations thereof. In some examples, the generally linear electrode may include an area where the edge of the area forms a wave, a bend, a curve, another formation, or combinations thereof.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approaches the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
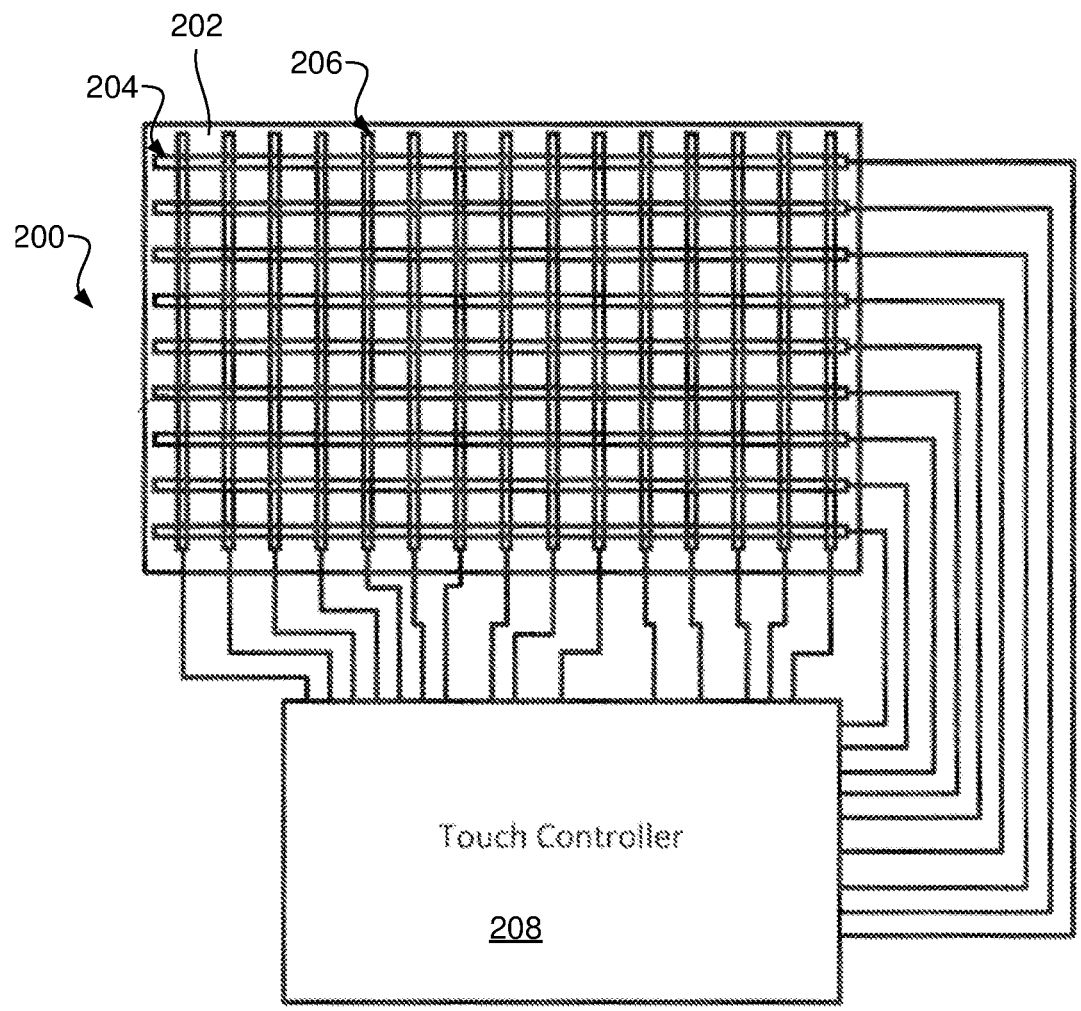
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
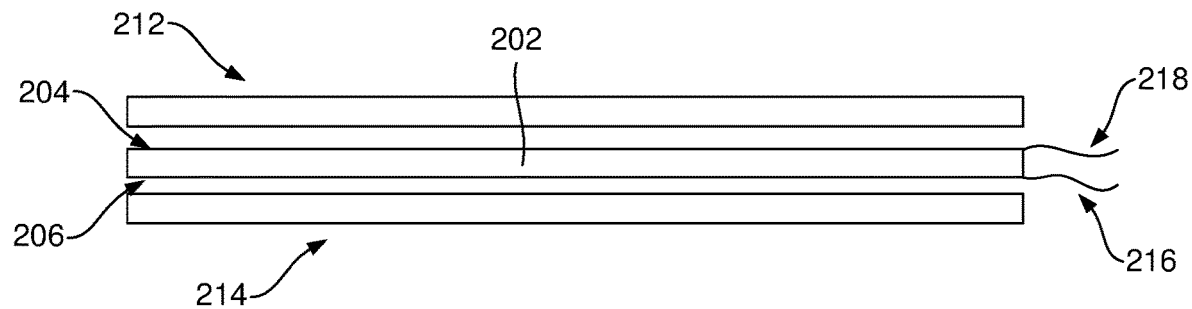
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approaches the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
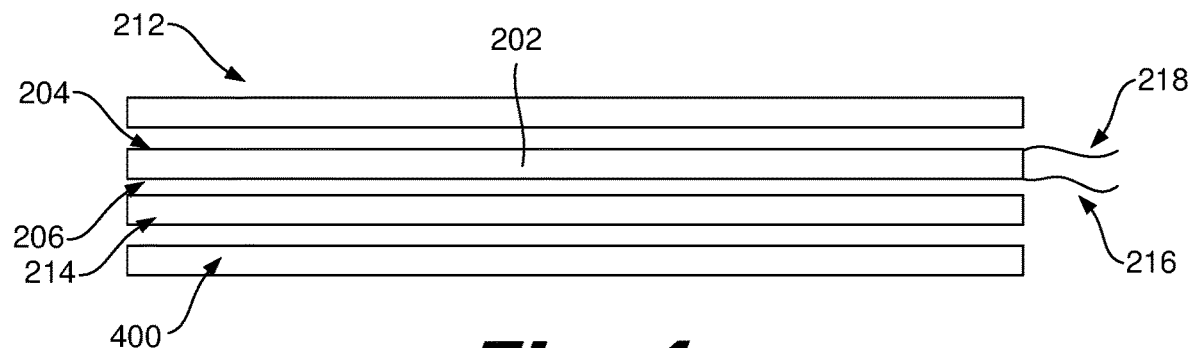
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

In some examples, the capacitance module may include a pressure sensor, in other examples, the pressure sensors are not incorporated with a capacitance module. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

In some examples, the pressure sensor may also include an ability to provide haptic feedback. For example, a piezoelectric device may be used as both a pressure sensor and as a haptic device. When the piezoelectric material is compressed due to the application of pressure through the capacitance reference surface, the piezoelectric material may produce an electric signal with can be detected by a controller. In some cases, the controller may produce an electric signal that is sent to the piezoelectric material to cause the piezoelectric material to expand, contract, and/or vibrate. The vibrations from the piezoelectric material may cause the capacitance reference surface to vibrate. This vibration may communicate a haptic signal to the user. However, in some examples, the pressure sensors are not configured to provide a haptic signal.

Figure 5:
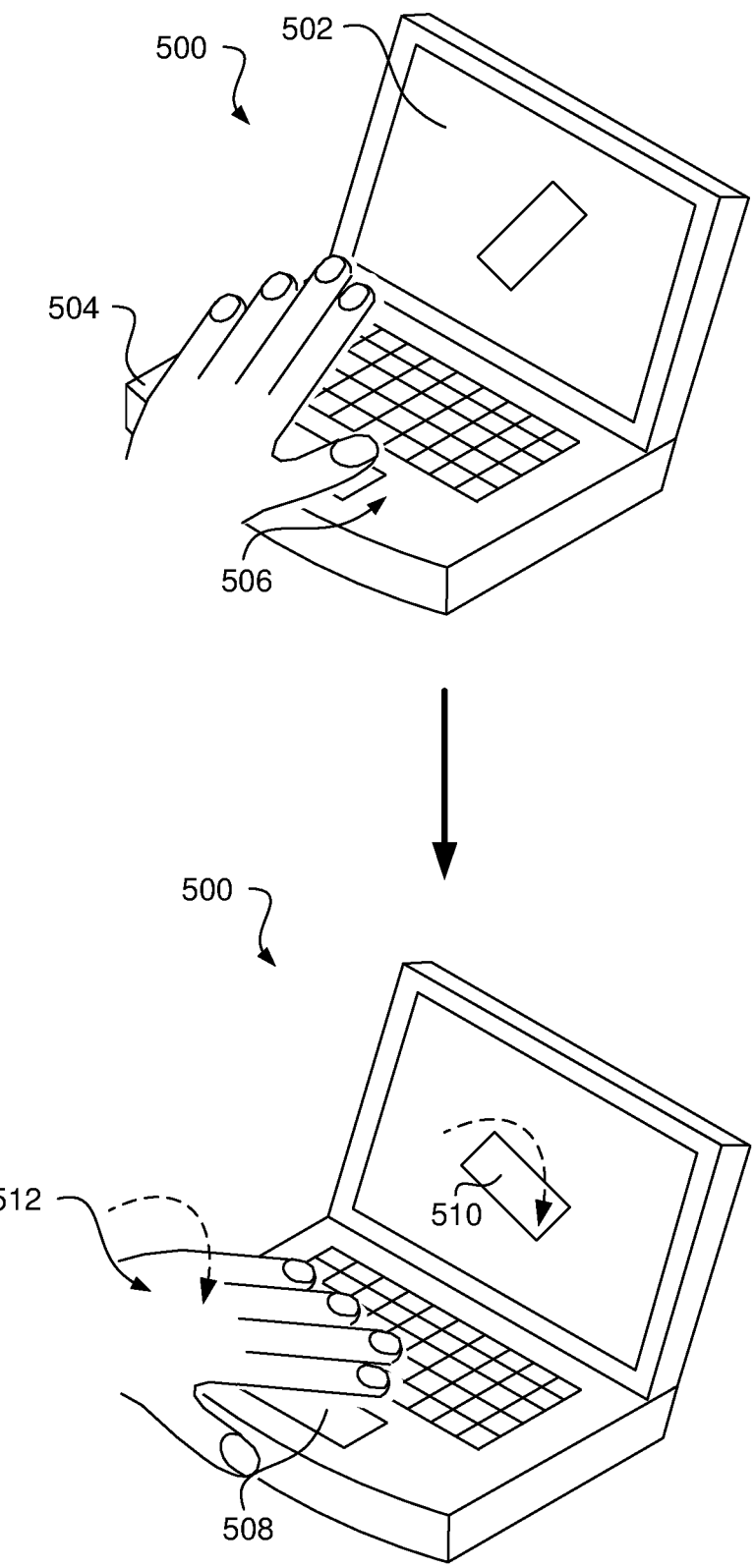
FIG. 5 depicts an example of an electronic device in accordance with the disclosure.

FIG. 5 depicts an example of an electronic device 500 having a display 502, a cover 504, a keyboard 506 incorporated into the cover 504, and a capacitance module disposed within the cover 504. The capacitance module may, in part, contribute to forming a touch sensitive area 508 of the cover or be inserted into an opening formed in the cover to form the touch sensitive area 508. In this example, a model 510 is depicted in the display 502. In this example, a hand gesture may be detectable, which may cause instructions to be sent to control the tilt angle of the model 510 depicted in the display 502. For example, a hand 512 may be positioned above and spaced away from the touch sensitive area and/or the keyboard at a distance. The hand 512 may also be positioned and spaced away from the display 502 at a distance. The hand 512 may be within a range to be detected with a capacitance proximity sensor. The capacitance proximity sensor may be the capacitance module forming the touch sensitive area 508 or it may be another capacitance sensor incorporated into or beneath the keyboard 506.

In some examples, when the hand tilts to the right, a controller to the proximity sensor sends an instruction to tilt the model to the right. Likewise, in some examples, when the hand tilts to the left, the controller sends an instruction to tilt the model to the left. Further, when the hand tilts forward, the controller may send an instruction to tilt the model forward, or when the hand tilts upward, the controller may send an instruction to tilt the model upward. The instruction may be to tilt the model to the degree that the hand tilts. However, in some examples, a tilt in any direction may be a binary instruction to tilt the object in that direction.

In other examples, determining that the hand is tilted may result in sending a non-tilting command. For example, tilting the hand to the right may result in an instruction to move the model to the right. Likewise tilting the hand in another direction may result in sending an instruction to move the model in the corresponding direction.

In some examples, moving the hand away from the cover, keyboard, touch sensitive area, or combinations thereof may result in sending an instruction to move the model higher in the display 502. Likewise, moving the hand closer to the cover, keyboard, touch sensitive area, or combinations thereof may result in sending an instruction to move the model lower in the display 502.

In some cases, rotating the hand in a direction may result in sending an instruction to rotate the model in a corresponding direction.

Figure 6:
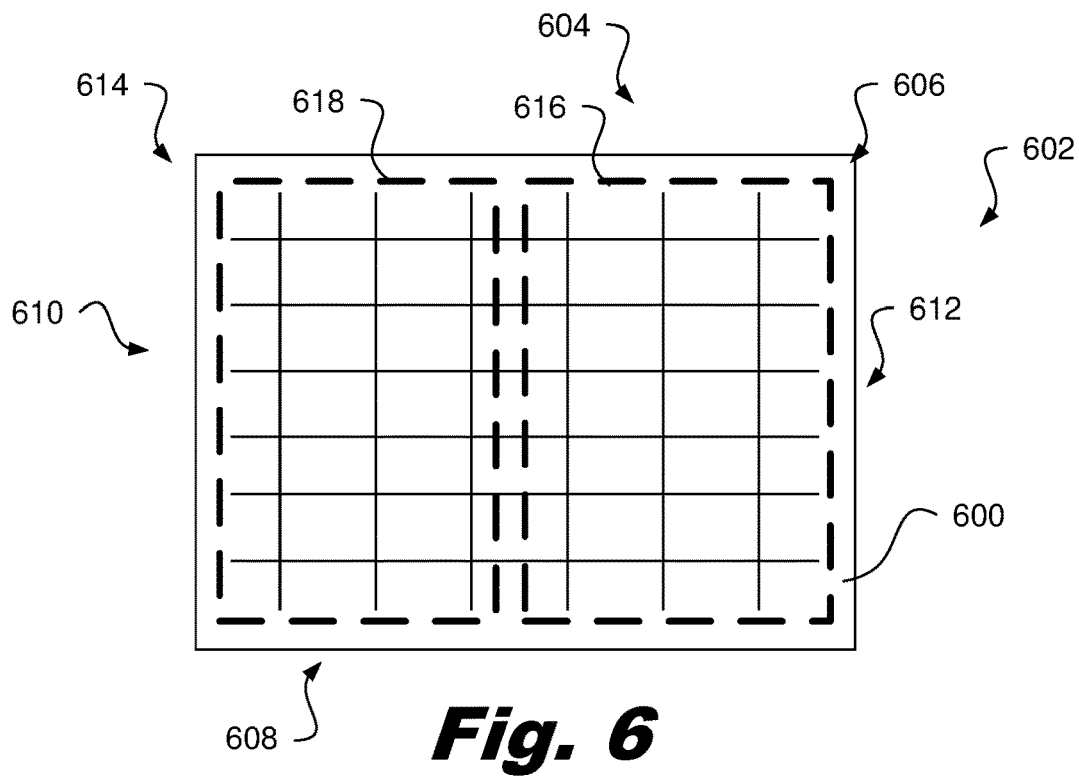
FIG. 6 depicts an example of capacitance sensor in accordance with the disclosure.

FIG. 6 depicts an example of a substrate 600 in a capacitance module 602. This module 602 may be used to form a touch sensitive area like the one described in FIG. 5 or it may be a capacitance module used in conjunction with a keyboard.

A first set 604 of generally linear electrodes may be arranged in a first direction from a first side 606 of the substrate 600 to a second side 608 of the substrate 600. The second side may be opposite the first side. A second set 610 of generally linear electrodes may be arranged in a second direction from a third side 612 of the substrate 600 to a fourth side 614 of the substrate 600. The third side may be opposite the fourth side. The first set 604 of electrodes may be transversely oriented with respect to the second set 610 of electrodes. In the example of FIG. 6, the first side is contiguous with the third side and fourth side, and the second side is contiguous with the third side and the fourth side.

In some examples, the first set of electrodes and the second set of electrodes work together in a mutual capacitance circuit where at least one set of electrodes is instructed to transmit a signal and the other set is instructed to sense a change in capacitance as a result of the transmission. In some cases, the electrodes may operate in a self-capacitance mode where each electrode both transmits and senses a change in capacitance as a result of the transmission.

Figure 7:
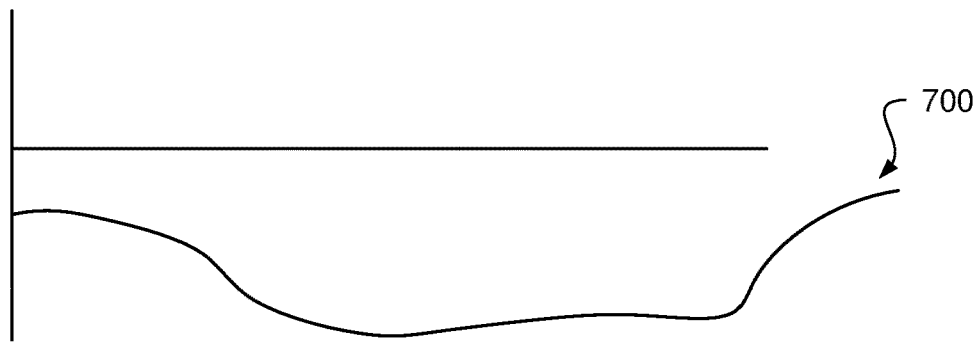
FIG. 7 depicts an example of a capacitance measurement in accordance with the disclosure.
Figure 8:
FIG. 8 depicts an example of a capacitance measurement in accordance with the disclosure.

In the example depicted in FIG. 6, a first sub-portion 616 of the first set of electrodes is configured to transmit a negative signal, and a second sub-portion 618 of the first set of electrodes is configured to transmit a positive signal. At least one electrode from the second set of electrodes may be used to sense the change in capacitance. If the sense electrode is used to measure the response when just the first sub-portion 616 is fired, then the sense electrode may receive a negative response of 700 as depicted in FIG. 7. If the sense electrode is used to measure the response when just the second sub-portion 618 is fired, then the sense electrode may receive a positive response of 800 as depicted in FIG. 8. In this example, the capacitance change value from the first sub-portion may be combined with the capacitance change value from the second sub-portion to get an overall value. For example, if the combined signal has a negative value, then the greatest change in capacitance may be closer to the area near to the first sub-portion which is depicted on the right side depicted in FIG. 6. In some examples, the controller may determine that since the greater change in capacitance is associated with the right side that the object is tilted towards the right side.

If the combined signal has a positive value, then the greatest change in capacitance may be closer to the area near to the second sub-portion with is depicted on the left side depicted in FIG. 6. In some examples, the controller may determine that since the greater change in capacitance is associated with the left side that the object is tilted towards the left side.

In some examples, a single instruction may be sent in response to determine that the object, such as the user hand, is tilted in a first direction regardless of how much the object is tilted. However, in other examples, the change of capacitance may be analyzed to determine the tilt degree angle. In response to determining the tilt degree angle a more refined instruction may be sent. In some cases, the instruction may include sending a signal to rotate the object in the display to rotate at a corresponding degree in the display. While this example includes sending instructions to rotate a model in a display in a similar direction as a user's hand, any appropriate instruction may be sent. A non-exhaustive list of example instructions may include tilting the model in a corresponding direction, tilting the model in a different direction, moving the model in a corresponding direction, moving the model in a different direction, adjusting an audio volume, adjusting a display brightness, adjusting another parameter of the electronic device, executing another command, or combinations thereof.

In another example, when the sense electrodes cross at least one transmit electrode that is transmitting a negative signal and at least one transmit electrode that is transmitting a positive signal at the same time, the responsive measurement picked up with the sense electrode may result in a positive signal, a neutral signal, or a negative signal. In some examples, if the responsive measurement is positive, the controller may determine that the object is tilting towards the side transmitting the positive signal. In some examples, if the responsive measurement is negative, the controller may determine that the object is tilting towards the side transmitting the negative signal. In some examples, if the responsive measurement is neutral, the controller may determine that the object is not tilting towards either side.

In such an example, where there is a neutral responsive signal, the responsive signal may also indicate that there is no object within range to detect. In such an example, the controller may send instructions to take another measurement having electrodes in both the first and second sub-portions transmit a positive signal or another type of signal to detect the presence of an object. In other examples, the capacitance sensor may use other methods to detect the presence of an object within the proximity range.

Figure 9:
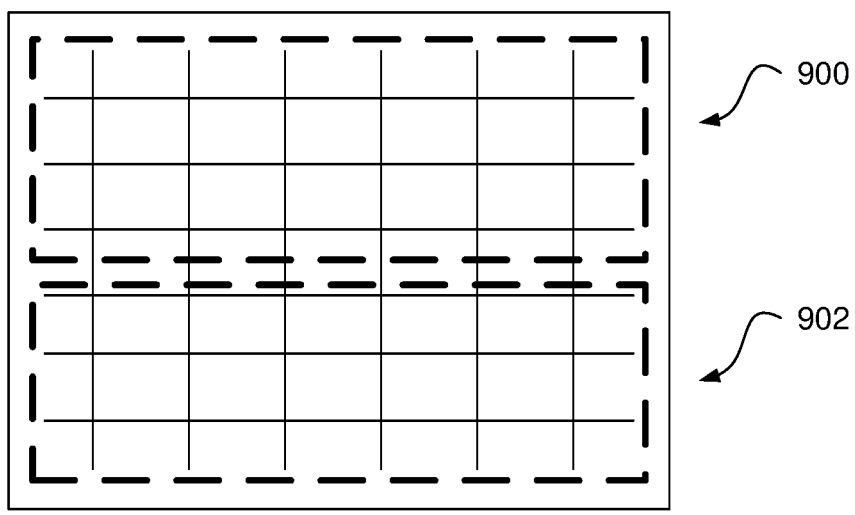
FIG. 9 depicts an example of a capacitance sensor in accordance with the disclosure.
Figure 10:
FIG. 10 depicts an example of a capacitance measurement in accordance with the disclosure.
Figure 11:
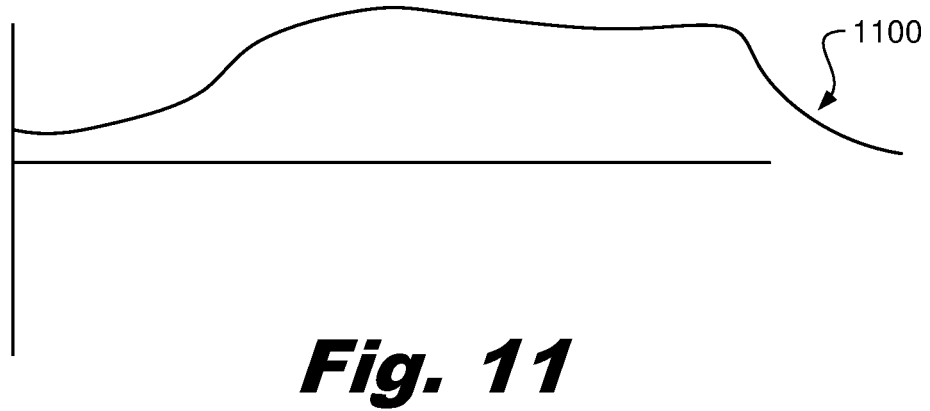
FIG. 11 depicts an example of a capacitance measurement in accordance with the disclosure.

FIG. 9 depicts another example, where the first set of electrodes is instructed to sense a change in capacitance and the second set of electrodes is instructed to transmit signals. Switching the role of the first and second sets of electrodes may allow for determining a tilt angle along the directions of an axis including the third and fourth side and not just the directions along an axis including just the first and second sides as described in FIGS. 6-8. In this example, a third sub-portion 900 of electrodes may be instructed to send a negative signal and a fourth sub-portion 902 of the electrodes may be used to transmit a positive signal. In some examples, the measurement taken with a sense electrode from the first set of electrodes when only the third sub-portion is transmitting may be a negative signal 1000 as depicted in FIG. 10. In some examples, the measurement recorded with a sense electrode from the first set of electrodes when only the fourth sub-portion is transmitting may be a positive signal 1100 as depicted in FIG. 11.

Figure 12:
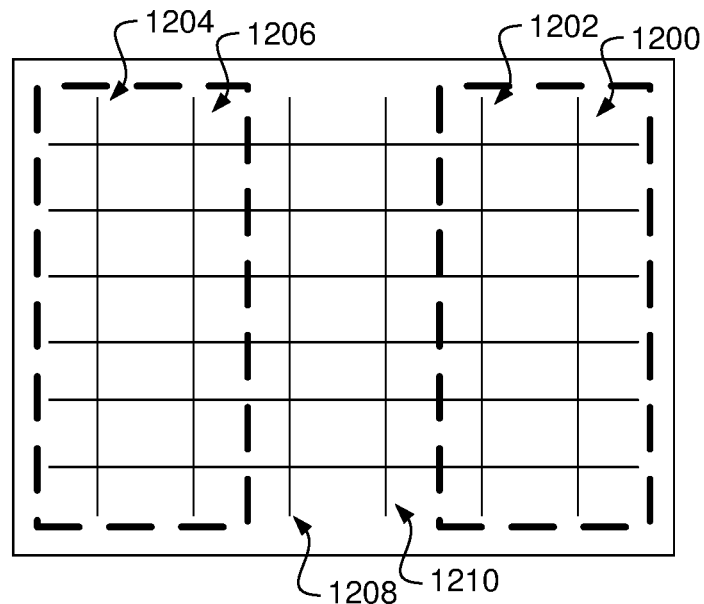
FIG. 12 depicts an example of a capacitance sensor in accordance with the disclosure.

While the examples of FIGS. 6-11 depict that all of the electrodes of both the first and second set are used to measure and/or sense the tilt of an object, any appropriate subset of the electrodes may be used. In the example depicted in FIG. 12, just electrodes 1200, 1202 are used to transmit a negative signal and just electrodes 1204, 1206 are used to transmit a positive signal. In the example depicted in FIG. 12, electrodes 1208, 1210 are not being used to determine the tilt of an object.

Figure 13:
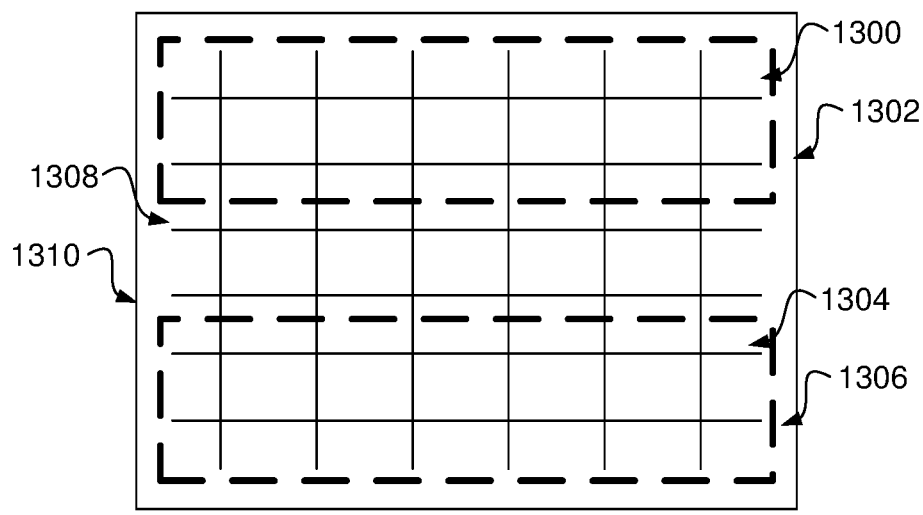
FIG. 13 depicts an example of a capacitance sensor in accordance with the disclosure.

In the example depicted in FIG. 13, just electrodes 1300, 1302 are used to transmit a negative signal and just electrodes 1304, 1306 are used to transmit a positive signal. In the example depicted in FIG. 13, electrodes 1308, 1310 are not being used to determine the tilt of an object.

Figure 14:
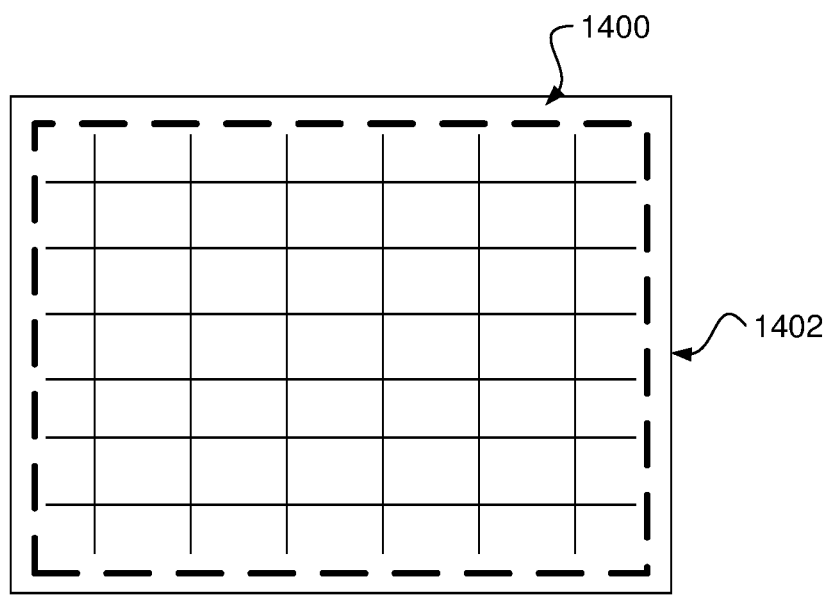
FIG. 14 depicts an example of a capacitance sensor in accordance with the disclosure.
Figure 15:
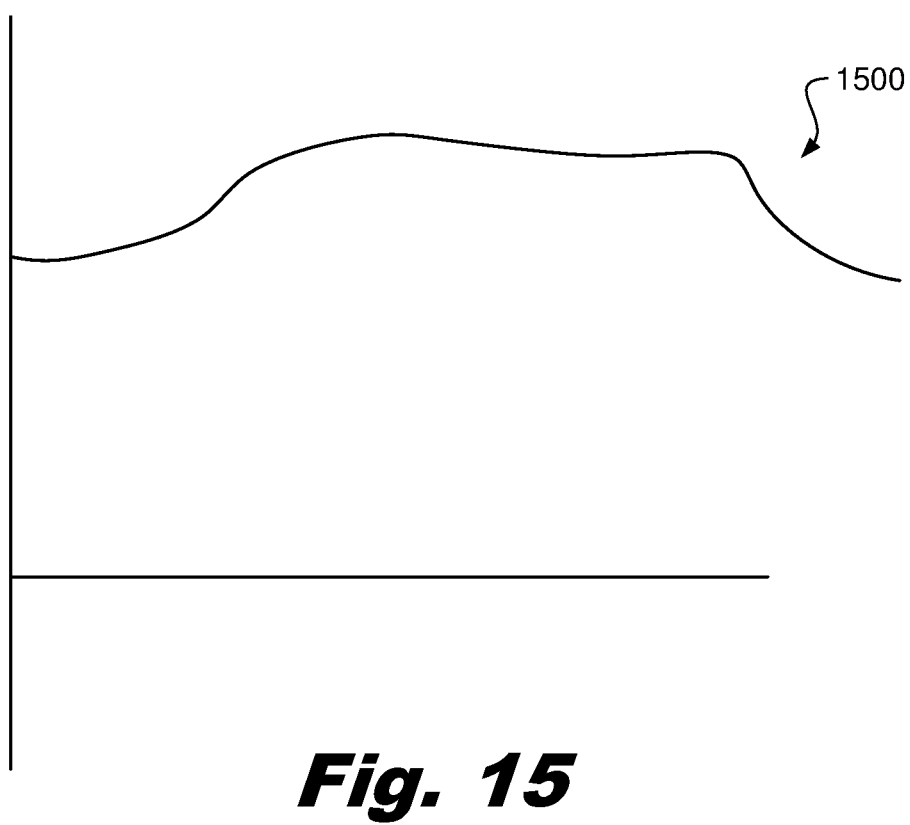
FIG. 15 depicts an example of a capacitance measurement in accordance with the disclosure.

In some examples, as depicted in FIG. 14, both the first set 1400 and the second set 1402 of electrodes may be used to transmit a signal at the same time. Using more electrodes at once regardless of the orientation of the electrode may result in projecting a greater capacitance field that increases the proximity sense range of a response measurement 1500 as depicted in FIG. 15. In such an example, transmitting with a first electrode and a second electrode at the same time that are transversely oriented with respect to each other may increase the proximity sense range. By increasing the proximity sense range, the height or elevation of the object may be easier to detect.

In this example, at least one sense electrode may be used to detect a change in capacitance. In other examples, multiple sensor electrodes may be used.

Figure 16:
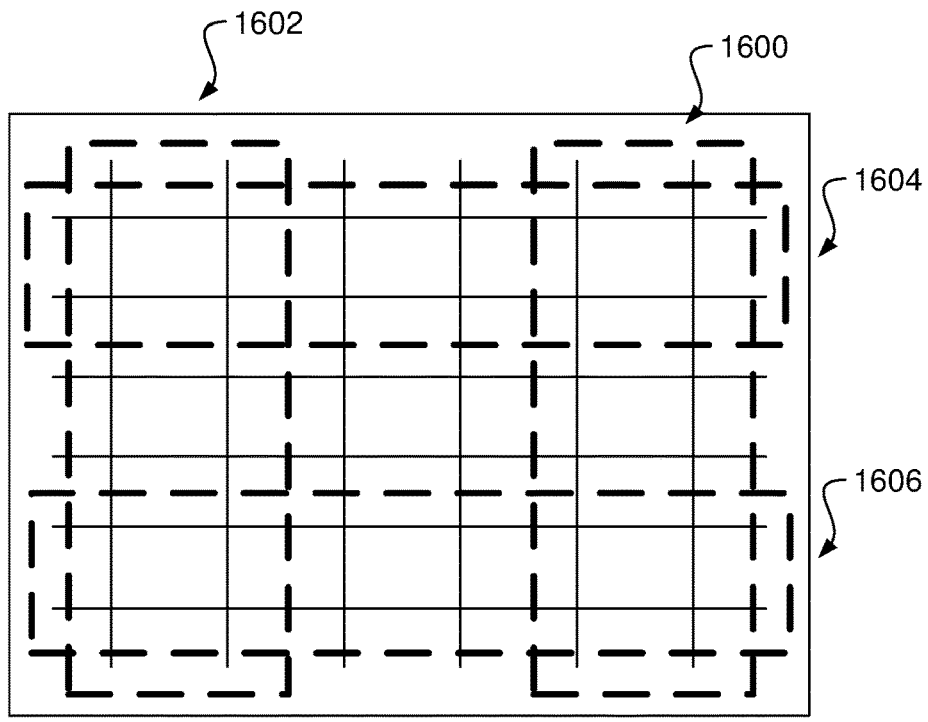
FIG. 16 depicts an example of a capacitance sensor in accordance with the disclosure.
Figure 17:
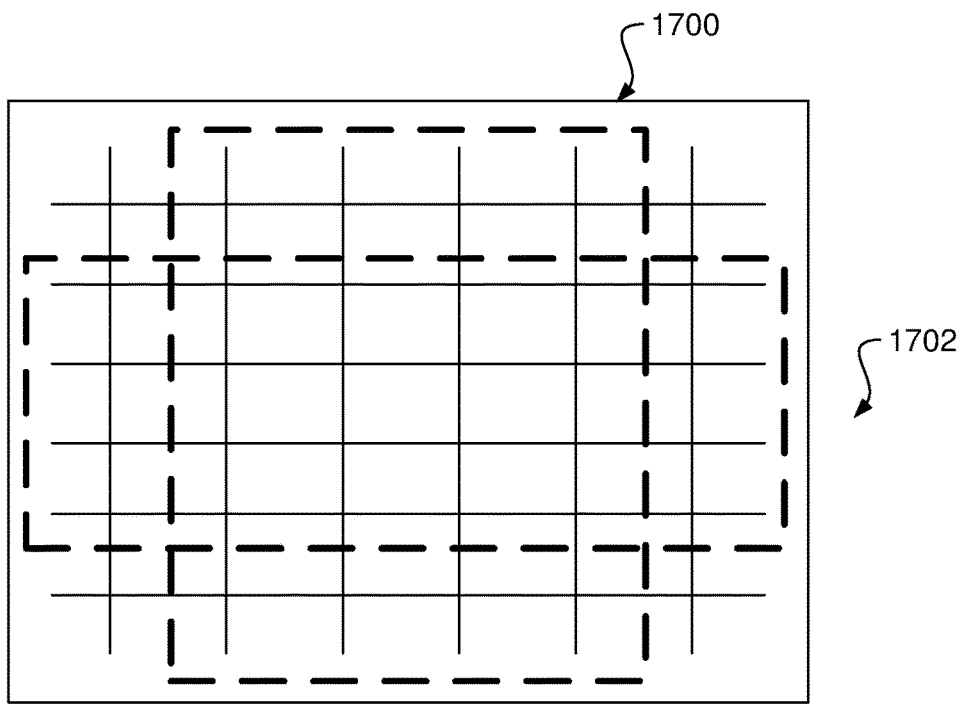
FIG. 17 depicts an example of a capacitance sensor in accordance with the disclosure.

In the example depicted in FIGS. 16 and 17, just a subset of the electrodes in the first set and just a subset of the electrodes in the second set are transmitted at the same time to detect the height of the object. In the example of FIG. 16, the electrodes 1600, 1602, 1604, 1606 on the outside of the substrate are transmitted together to detect the height of the object. In the example of FIG. 17, the electrodes 1700, 1702 on the inside of the substrate are transmitted together to detect the height of the object.

Figure 18:
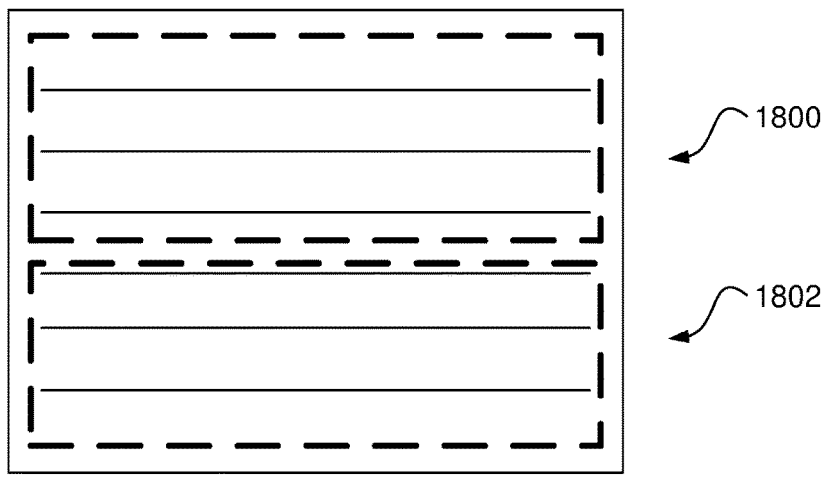
FIG. 18 depicts an example of a capacitance sensor in communication with a controller in accordance with the disclosure.

FIG. 18 depicts an example of a substrate with a first set of electrodes. The first set of electrodes may be in the same stack of layers with the second set of electrodes depicted in FIG. 19 but located on a different surface in the stack of electrodes. However, in other examples, the electrodes depicted in FIG. 18 may be the only capacitance electrodes in the stack of layers.

In some examples, the first set of electrodes operate in a self-capacitance process by transmitting a signal and also sensing the change in capacitance based on the transmission. In some cases, a first sub-portion 1800 of the electrodes in the first set transmit a negative signal and sense a response signal. The second sub-portion 1802 of the electrodes in the first set transmit a positive signal and sense a response signal. In some examples, the first sub-portion of electrodes sense a negative response signal, and the second sub-portion of electrodes sense a positive signal. The negative response signal and the positive response signal may be combined to make a combined signal. In some cases, when the combined signal is negative, it may be determined that the object is tilting towards the electrodes transmitting and receiving the negative signal. In some cases, when the combined signal is positive, it may be determined that the object is tilting towards the electrodes transmitting and receiving the positive signal.

Figure 21:
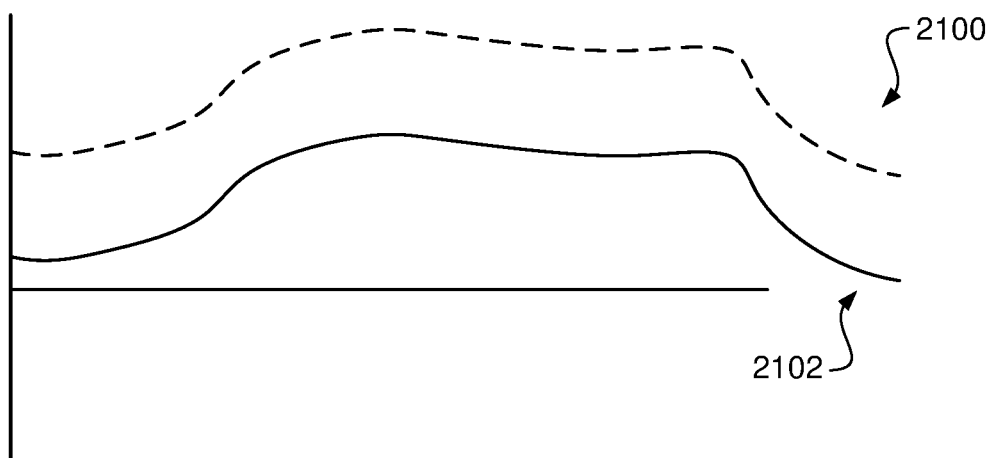
FIG. 21 depicts an example of a capacitance measurement of a module in accordance with the disclosure.

In some examples, the first sub-portion of electrodes and the second sub-portion of electrodes may both transmit a positive signal. In such an example, the first sub-portion may receive a first response signal and the second sub-portion may receive a second response signal. In these examples, the strength of the first response signal may be compared to the strength of the second response signal. An example of the first response measurement and the second response measurement are depicted in FIG. 21. When the first response signal 2100 has a higher value than the second response signal 2102, then it may be determined that the object is tiling towards the first sub-portion. When the second response signal 2102 has a higher value than the first response signal 2100, then it may be determined that the object is tiling towards the second sub-portion.

Figure 19:
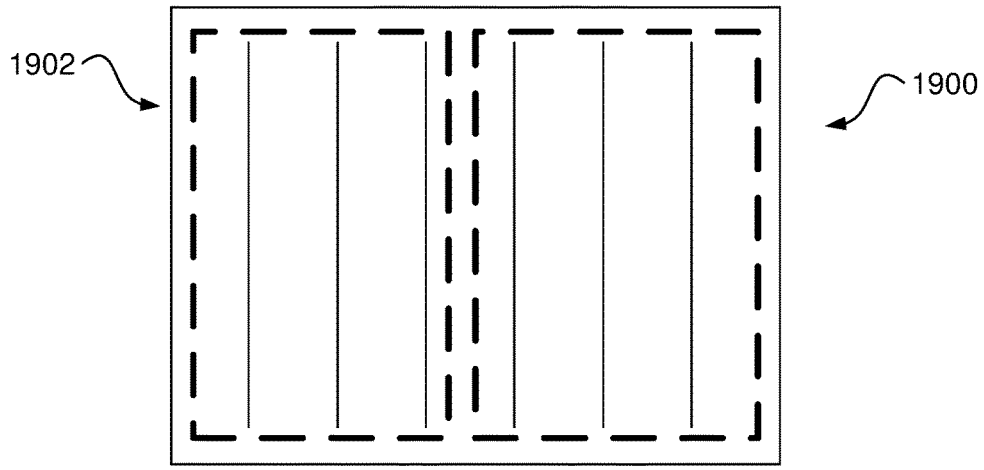
FIG. 19 depicts an example of a capacitance sensor in accordance with the disclosure.

FIG. 19 depicts an example of a second set of electrodes that are located in the same stack of electrodes with the first set of electrodes depicted in FIG. 18. This second set of electrodes may have a third sub-portion 1900 and a fourth sub-portion 1902 that can be used in a similar way as the first set of electrodes as described in connection with FIG. 18 except to be used to detect the tilt of the object in a different direction. In this example, each of the first set of electrodes and the second set of electrodes may be configured to operate in multiple modes at different times such as a mutual capacitance mode and a self-capacitance mode.

Figure 20:
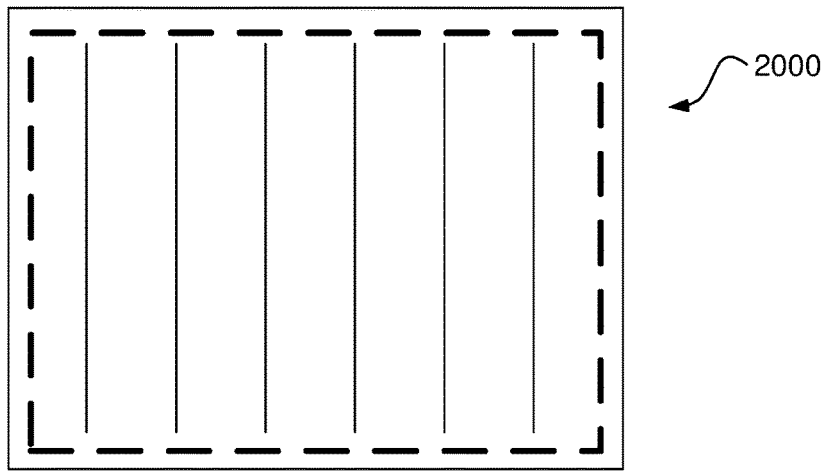
FIG. 20 depicts an example of a capacitance sensor in accordance with the disclosure.

FIG. 20 depicts an example of a set of self-capacitance electrodes 2000 transmitting and receiving at the same time as each other to detect the height of the object.

Figure 22:
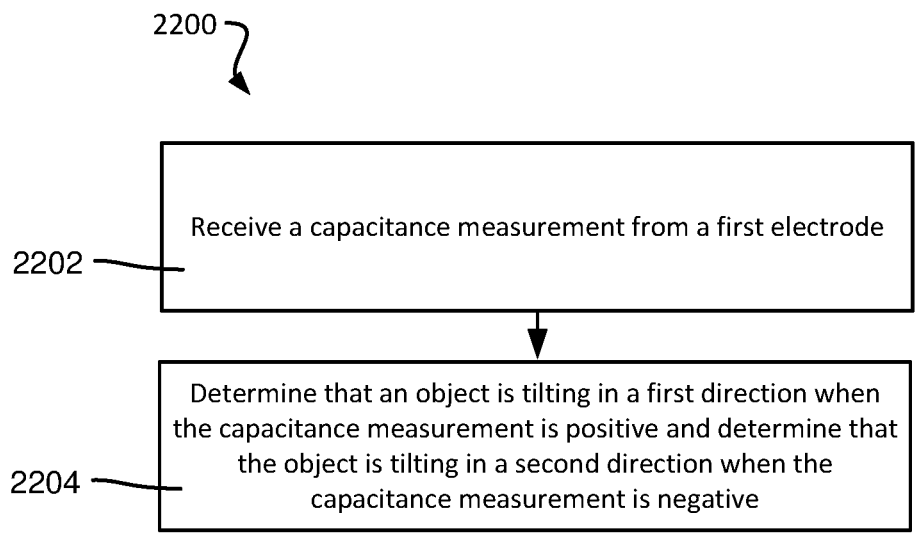
FIG. 22 depicts an example of a method of operating a capacitance module in accordance with the disclosure.

FIG. 22 depicts an example of a method 2200 of determining tilt. This method 2200 may be performed based on the description of the devices, modules, and principles described in relation to FIGS. 1-21. In this example, the method 2200 includes receiving 2202 a capacitance measurement from a first electrode and determining 2204 that an object is tilting in a first direction when the capacitance measurement is positive and determine that the object is tilting in a second direction when the capacitance measurement is negative.

Figure 23:
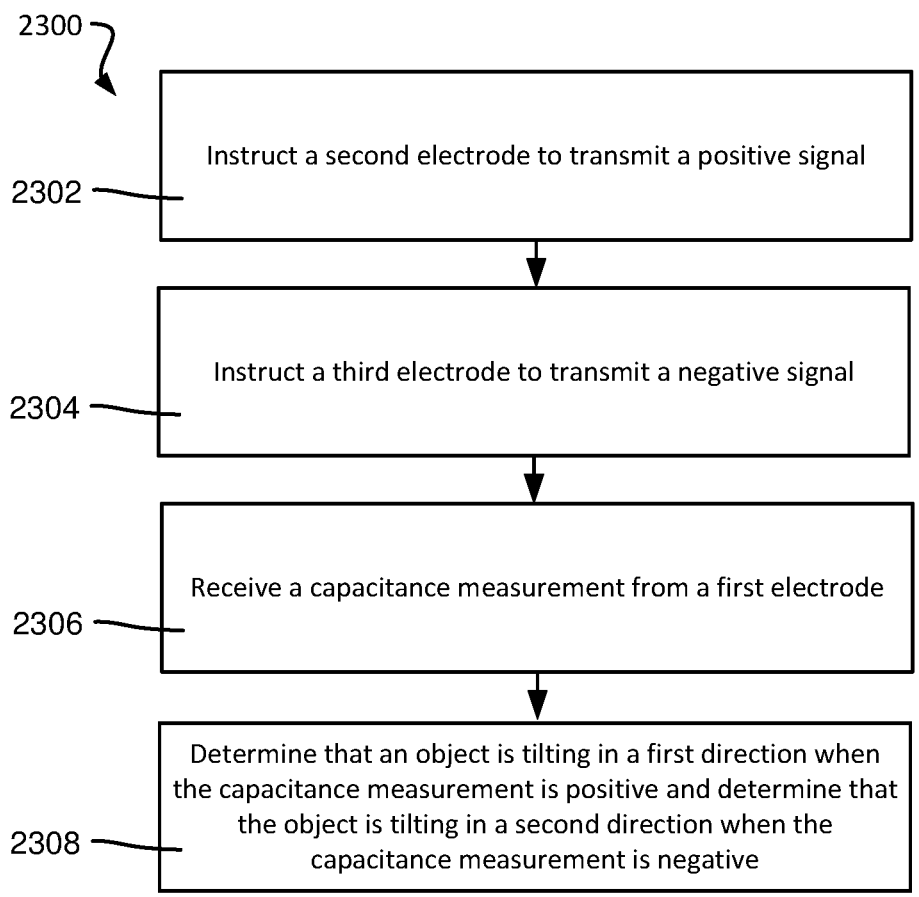
FIG. 23 depicts an example of a method of operating a capacitance module in accordance with the disclosure.

FIG. 23 depicts an example of a method 2300 of determining tilt. This method 2300 may be performed based on the description of the devices, modules, and principles described in relation to FIGS. 1-21. In this example, the method 2300 includes instructing 2302 a second electrode to transmit a positive signal, instruct 2304 a third electrode to transmit a negative signal, receiving 2306 a capacitance measurement from a first electrode; and determining 2308 that an object is tilting in a first direction when the capacitance measurement is positive and determine that the object is tilting in a second direction when the capacitance measurement is negative.

Figure 24:
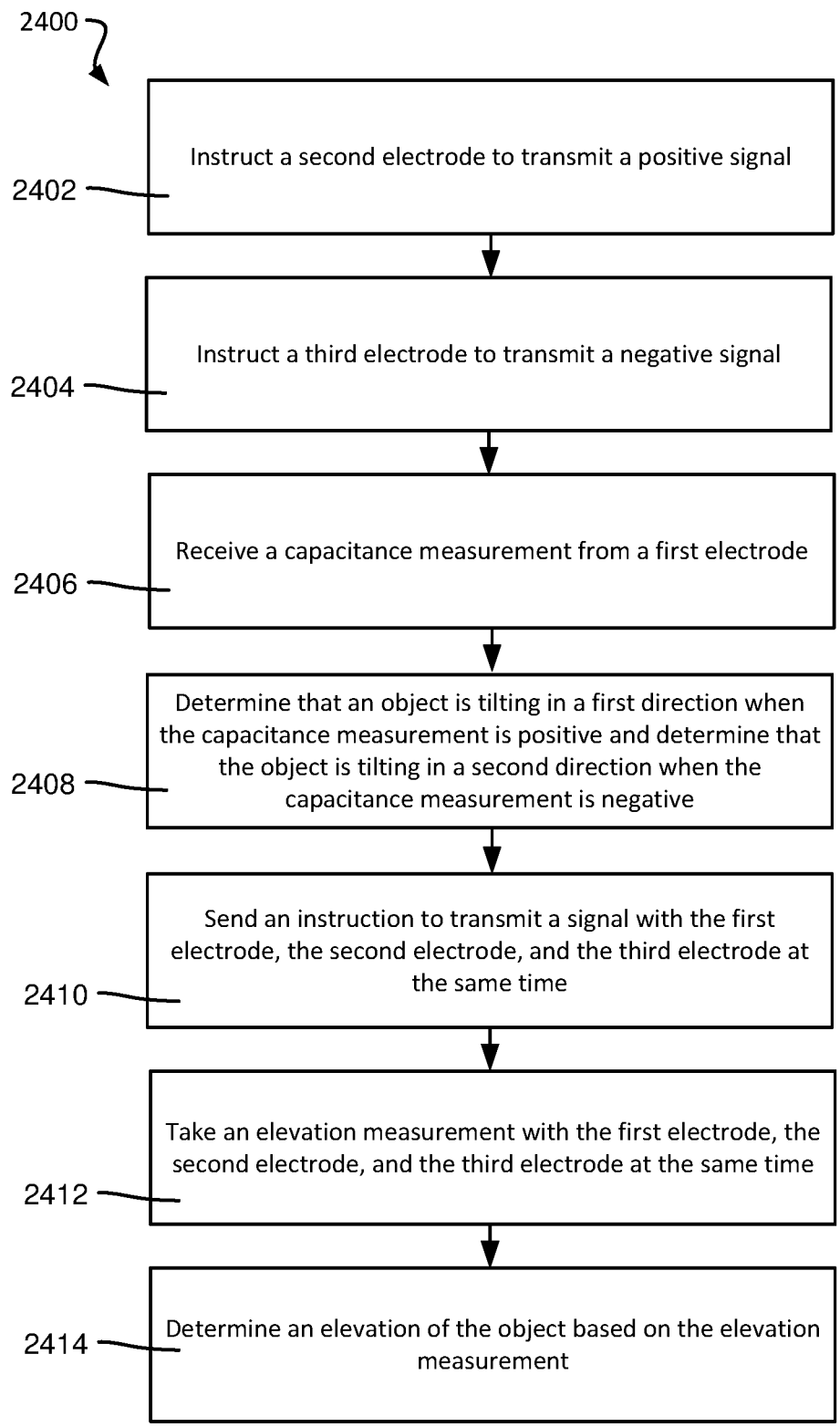
FIG. 24 depicts an example of a method of operating a capacitance module in accordance with the disclosure.

FIG. 24 depicts an example of a method 2400 of determining tilt. This method 2400 may be performed based on the description of the devices, modules, and principles described in relation to FIGS. 1-21. In this example, the method 2400 includes instructing 2402 a second electrode to transmit a positive signal, instruct 2404 a third electrode to transmit a negative signal, receiving 2406 a capacitance measurement from a first electrode; determining 2308 that an object is tilting in a first direction when the capacitance measurement is positive and determine that the object is tilting in a second direction when the capacitance measurement is negative; sending 2410 an instruction to transmit a signal with the first electrode, the second electrode, and the third electrode at the same time; take 2412 an elevation measurement with the first electrode, the second electrode, and the third electrode at the same time; and determine 2414 an elevation of the object based on the elevation measurement.

Figure 25:
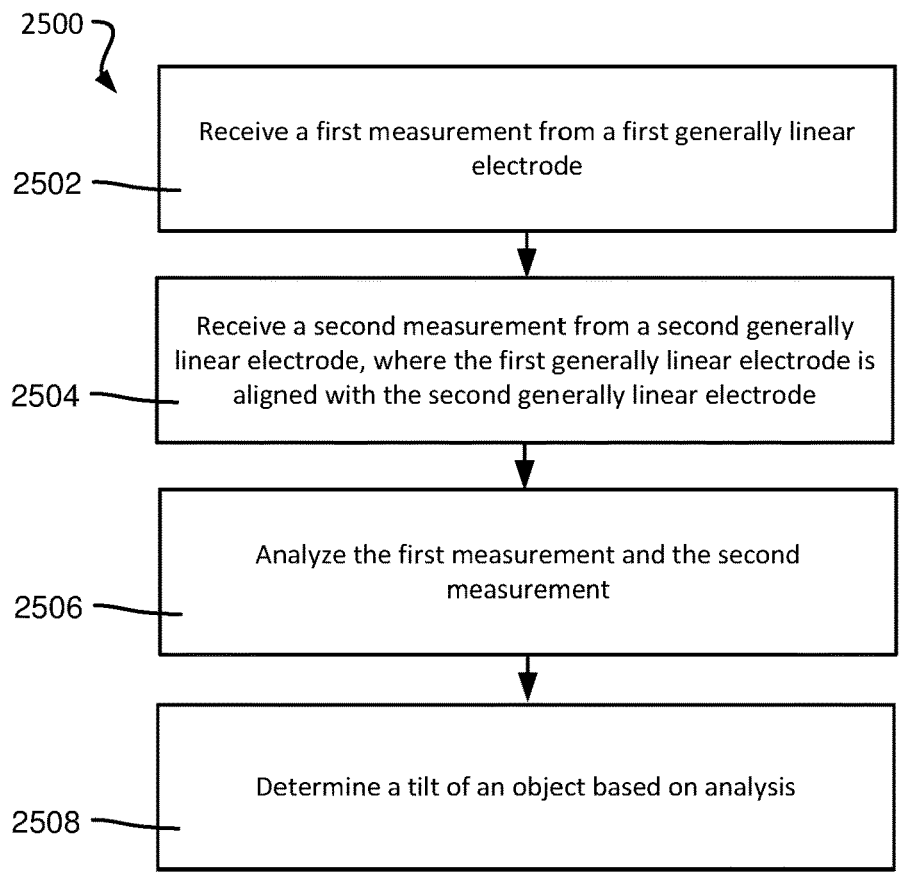
FIG. 25 depicts an example of a method of operating a capacitance module in accordance with the disclosure.

FIG. 25 depicts an example of a method 2500 of determining tilt. This method 2500 may be performed based on the description of the devices, modules, and principles described in relation to FIGS. 1-21. In this example, the method 2500 includes receiving 2502 a first measurement from a first generally linear electrode; receiving 2504 a second measurement from a second generally linear electrode, where the first generally linear electrode is aligned with the generally linear electrode; analyzing 2506 the first measurement and the second measurement; and determining 2508 a tilt of an object based on the analysis.

Figure 26:
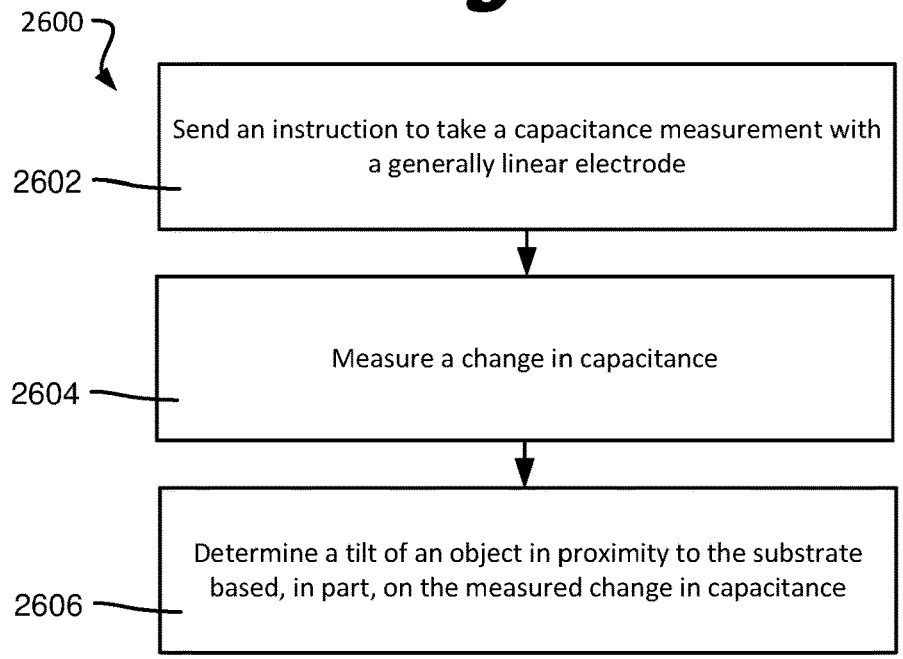
FIG. 26 depicts an example of a method of operating a capacitance module in accordance with the disclosure.

FIG. 26 depicts an example of a method 2600 of determining tilt. This method 2600 may be performed based on the description of the devices, modules, and principles described in relation to FIGS. 1-21. In this example, the method 2600 includes sending 2602 an instruction to take a capacitance measurement with a generally linear electrode; measuring 2604 a change in capacitance; and determining 2606 a tilt of an object in proximity to the substrate based, in part, on the measured change in capacitance.

Figure 27:
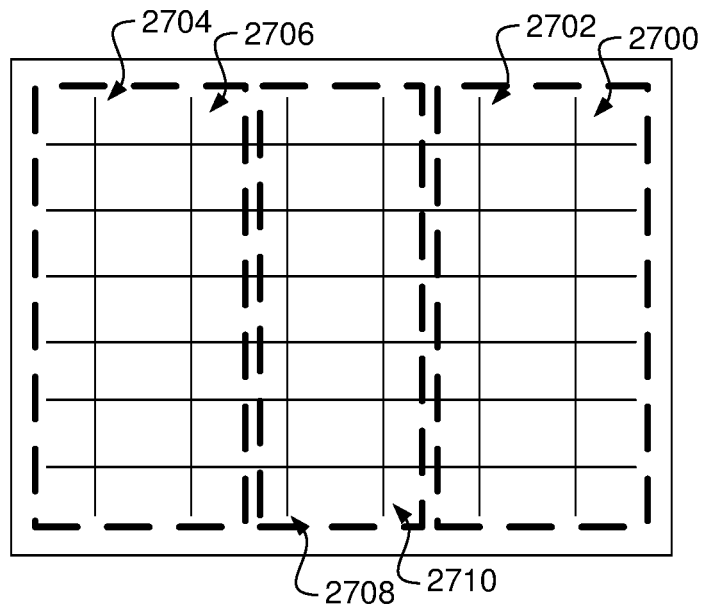
FIG. 27 depicts an example of a capacitance sensor in accordance with the disclosure.

In the example depicted in FIG. 27, just electrodes 2700, 2702 are used to transmit a negative signal and just electrodes 2704, 2706 are used to transmit a positive signal. In the example depicted in FIG. 27, electrodes 2708, 2710 are instructed to sense the change in capacitance from the transmissions. While this example depicts multiple electrodes instructed to sense the change in capacitance, in other examples, a single electrode may be instructed to sense capacitance.

In some examples, electrodes 2708, 2710 may receive different measurements reflecting the change in capacitance since each of these electrodes is closer to a different group of electrodes transmitting at different values. The measurements taken with electrodes 2708, 2710 may be combined to form a combined measurement. In those examples where the combined measurement is positive, it may be determined that the object is tilting towards electrodes 2704, 2706. In those examples where the combined measurement is negative, it may be determined that the object is tilting towards electrodes 2700, 2702. In this example, the electrodes instructed to transmit a signal and the electrodes that are instructed to measure the change in capacitance as a result of the transmissions are aligned with each other.

Figure 28:
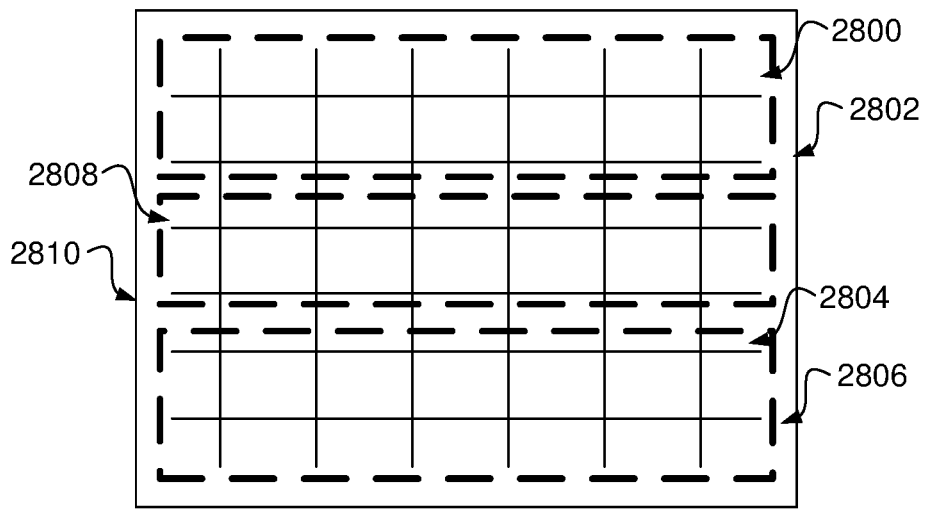
FIG. 28 depicts an example of a capacitance sensor in accordance with the disclosure.

In the example depicted in FIG. 28, just electrodes 2800 and 2802 are used to transmit a negative signal and just electrodes 2804, 2806 are used to transmit a positive signal. In the example depicted in FIG. 28, electrodes 2808, 2810 are instructed to sense the change in capacitance from the transmissions. While this example depicts multiple electrodes instructed to sense the change in capacitance, in other examples, a single electrode may be instructed to sense capacitance.

In some examples, electrodes 2808, 2810 may receive different measurements reflecting the change in capacitance since each of these electrodes is closer to a different group of electrodes transmitting at different values. The measurements taken with electrodes 2808, 2810 may be combined to form a combined measurement. In those examples where the combined measurement is positive, it may be determined that the object is tilting towards electrodes 2804, 2806. In those examples where the combined measurement is negative, it may be determined that the object is tilting towards electrodes 2800, 2802. In this example, the electrodes instructed to transmit a signal and the electrodes that are instructed to measure the change in capacitance as a result of the transmissions are aligned with each other.

Figure 29:
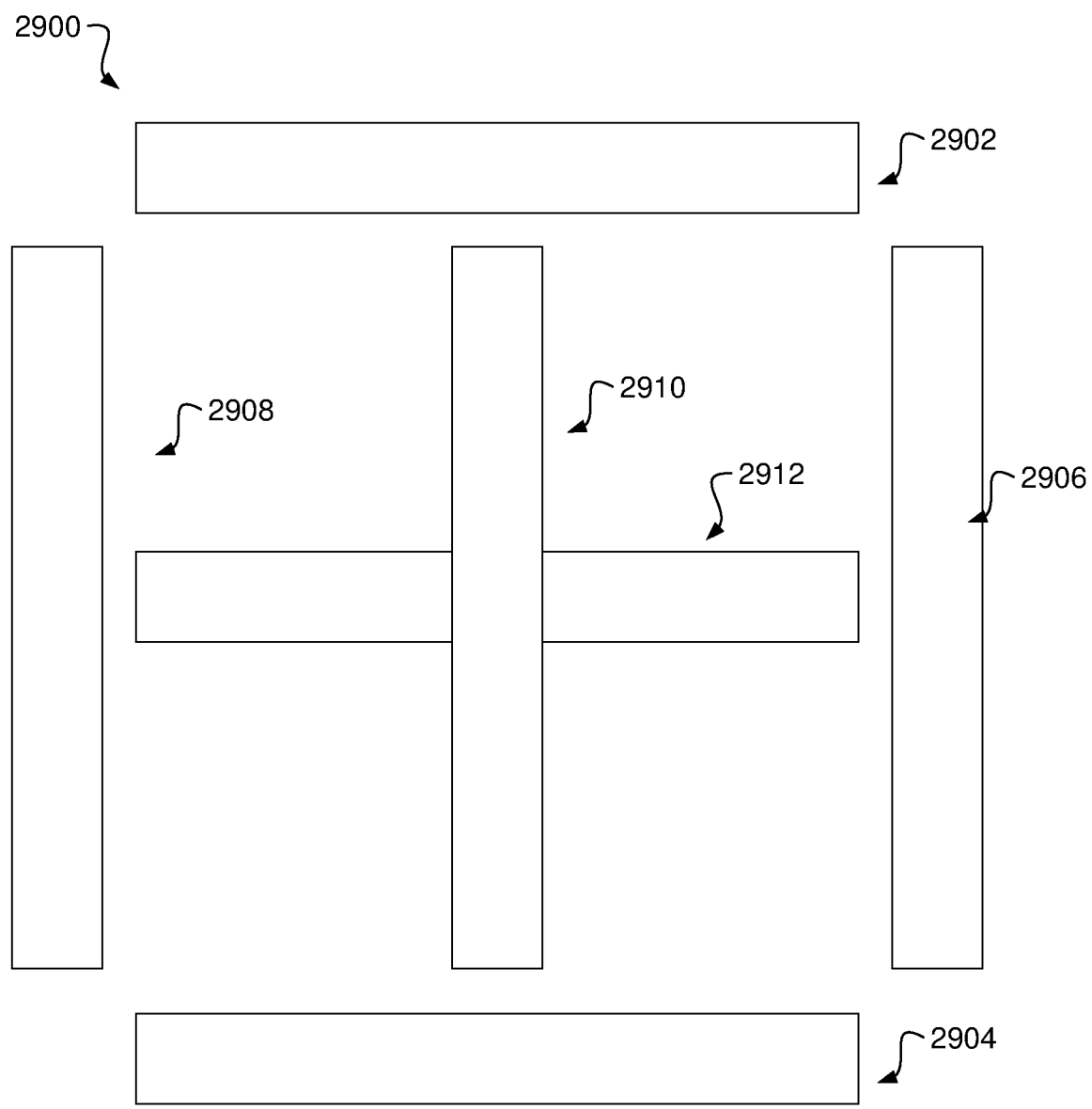
FIG. 29 depicts an example of a capacitance sensor in accordance with the disclosure.

FIG. 29 depicts an example of capacitance sensor 2900 with transmit electrodes 2902, 2904 for measuring tilt in a first direction and transmit electrodes 2906 and 2908 for measuring tilt in a second direction. Sense electrode 2912 may be used to measure the change in capacitance from the transmissions of electrodes 2906 and 2908. In this example, sense electrode 2912 is transversely oriented with respect to electrodes 2906, 2908. In the illustrated example, the entire length of sense electrode 2912 is between transmit electrodes 2906, 2908. Transmit electrodes 2906, 2908 may transmit signals with different polarities. For example, transmit electrode 2906 may be instructed to transmit a negative signal while transmit electrode 2908 may be instructed to transmit a positive signal. The change in capacitance may be influenced by both the positive and negative signals. As a result, the measured change in capacitance may be positive or negative based on which transmission results in the greatest change in capacitance.

Sense electrode 2910 may be used to measure the change in capacitance from the transmissions of electrodes 2902 and 2904. In this example, sense electrode 2910 is transversely oriented with respect to electrodes 2902, 2904. In the illustrated example, the entire length of sense electrode 2910 is between transmit electrodes 2902, 2904. Transmit electrodes 2902, 2904 may transmit signals with different polarities. For example, transmit electrode 2902 may be instructed to transmit a negative signal while transmit electrode 2904 may be instructed to transmit a positive signal. The change in capacitance may be influenced by both the positive and negative signals. As a result, the measured change in capacitance may be positive or negative based on which transmission results in the greatest change in capacitance.

Sense electrode 2910 and sense electrode 2912 may be electrically isolated from each other. In some examples, sense electrode 2910 may be on a different layer than electrode 2912. In some examples, an electrically isolating material may separate electrode 2912 from electrode 2910.

In some examples, at least one of the electrodes depicted in FIG. 29 may be plate capacitors, electrodes that are part of a mutual capacitance circuit, electrodes that are part of a self-capacitance circuit, part of another type of circuit, or combination thereof.

In some examples, at least some of the transmit electrodes 2902, 2904, 2906, 2908, and at least one of the sense electrodes 2910, 2912 may be configured to transmit a signal at the same time to create a greater capacitance field projection that can be used to determine an elevation of the object.

Figure 30:
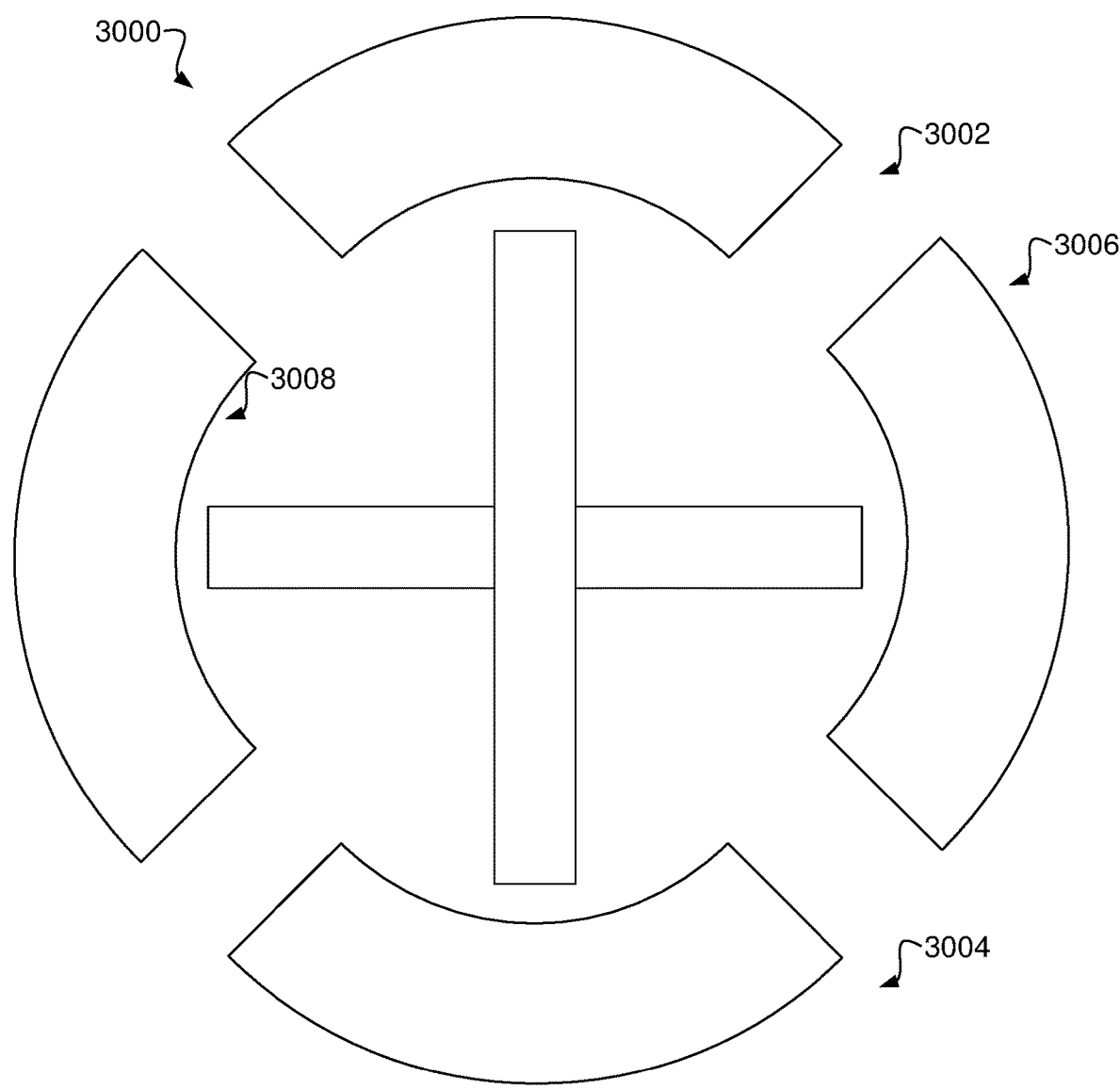
FIG. 30 depicts an example of a capacitance sensor in accordance with the disclosure.

FIG. 30 depicts an example of a sensor 3000 with at least one curved transmit electrode 3002, 3004, 3006, and 3008. While the electrodes disclosed herein have been presented with specific shapes, the electrodes may include any appropriate type of shape.

Specific details are given in the description to provide a thorough understanding of the embodiments. However, it will be understood by one of ordinary skills in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:
1. A capacitance module, comprising:
  a substrate,
  a set of electrodes formed on the substrate where a first electrode of the set is aligned with a second electrode of the set;
  a controller in communication with the set of electrodes;
  memory having programmed instructions configured to cause the controller, when executed, to:
    measure a change in capacitance; and
    determine a tilt of an object within a proximity sense range to the substrate based, in part, on the measured change in capacitance;
  wherein measuring a change in capacitance includes transmitting a positive signal with the first electrode and transmitting a negative signal with the second electrode.

2. The capacitance module of claim 1, wherein measuring a change in capacitance includes:
  transmitting a signal with the first electrode; and
  measuring a response with the second electrode.

3. The capacitance module of claim 1, wherein measuring a change in capacitance includes:
  transmitting a signal with the second electrode when the first electrode is transmitting the signal; and
  measuring a response with the second electrode when the first electrode is measuring the response.

4. The capacitance module of claim 1, further including a second set of electrodes transversely oriented with respect to the first set of electrodes.

5. The capacitance module of claim 1, wherein measuring a change in capacitance includes combining a first response measurement from a first signal and combining a second response measurement from the second signal to make a combined response measurement.

6. The capacitance module of claim 5, wherein determining a tilt of the object includes determining that the tilt is in a first direction when the combined measurement has a positive value and determining that the tilt is in a second direction with the combined measurement has a negative value.

7. The capacitance module of claim 1, wherein determining a tilt of the object includes determining that the tilt is in a first direction when a response measurement has a positive value and determining that the tilt is in a second direction with the response measurement has a negative value, wherein the response measurement is made with a sense electrode in communication with both the first electrode and the second electrode.

8. The capacitance module of claim 1, wherein measuring a change in capacitance includes:
  transmitting a signal with the first generally linear electrode and the second generally linear electrode; and
  measuring a response with a third generally linear electrode that is transversely oriented with respect to the first generally linear electrode and to the second generally linear electrode.

9. A non-transitory computer-readable medium storing instructions executable by a controller to:
  instruct a first electrode to transmit a positive signal;
  instruct a second electrode to transmit a negative signal;
  receive a first measurement from the first electrode;
  receive a second measurement from the second electrode, where the first electrode is aligned with the second electrode;
  analyze the first measurement and the second measurement; and
  determine that an object is tilting in a first direction when the capacitance measurement is positive and determine that the object is tilting in a second direction when the capacitance measurement is negative.

10. The non-transitory computer-readable medium of claim 9, wherein analyzing the first measurement and the second measurement includes: combining the first measurement and the second measurement to form a combined measurement.

11. The non-transitory computer-readable medium of claim 10, wherein determining the tilt includes determining that the tilt is in a first direction when the combined measurement has a positive value and determining that the tilt is in a second direction with the combined measurement has a negative value.

12. The non-transitory computer-readable medium of claim 9, wherein analyzing the first measurement and the second measurement includes: determining a tilt of an object includes determining that the object is tilted in a first direction when the first measurement is greater than the second measurement, and determining that the object is tilted in a second direction when the second measurement is greater than the first measurement.

13. The non-transitory computer-readable medium of claim 9, wherein the instructions are further executable to: send an instruction to transmit a signal with the first electrode and the second electrode at the same time to determine an elevation of the object.

14. The non-transitory computer-readable medium of claim 9, wherein the first electrode is a first electrode is a sense electrode in communication with the second electrode and the third electrode; and wherein the first electrode is transversely oriented with respect to the second electrode and the third electrode.

15. The non-transitory computer-readable medium of claim 14, wherein the instructions are executable to: send an instruction to transmit a signal with the first electrode, the second electrode, and the third electrode at the same time.

16. The non-transitory computer-readable medium of claim 15, wherein the instructions are executable to: take an elevation measurement with the first electrode, the second electrode, and the third electrode at the same time; and determine an elevation of the object based on the elevation measurement.

17. The non-transitory computer-readable medium of claim 9, wherein the capacitance measurement is a mutual capacitance measurement.

\* \* \* \* \*